Feb. 10, 1953

C. M. BREHM 2,627,921

TUBE CUTTING DIE

Filed July 2, 1949

INVENTOR
Charles M. Brehm
BY
Marechal & Biebel
ATTORNEYS

Patented Feb. 10, 1953

2,627,921

UNITED STATES PATENT OFFICE 2,627,921

TUBE CUTTING DIE

Charles M. Brehm, Springfield, Ohio, assignor to
The Steel Products Engineering Company,
Springfield, Ohio, a corporation of Ohio Application July 2, 1949, Serial No. 102,770

10 Claims. (Cl. 164—40)

This invention relates to apparatus for cutting tubular material such as metal tubing and the like.

One of the principal objects of the invention is to provide a machine for quickly and accurately cutting tubular stock substantially without loss of material in the cutting operation and with minimum distortion or burr formation adjacent the points along the stock where the cuts are made.

Another object is to provide a machine for cutting off lengths of tubing from tubular stock in a press or like machine and including tube cutting dies which operate during a single working stroke of the machine to carry out a plurality of shearing cuts in different directions transversely of the tube to cut off lengths therefrom substantially without distortion of the stock or loss of material at the point where the cut is made.

An additional object is to provide tube cutting apparatus including relatively movable cutting members which are positioned both inside and outside of the tube for conjoint relative shearing movement transversely of the tube to carry out cutting operations while supporting the tube from both inside and outside against distortion during cutting.

It is also an object of the invention to provide tube cutting apparatus for use in conjunction with a punch press or like machine which includes a releasable stop for locating the stock in proper predetermined position for cutting and which also includes operating means for the stop such that the stop is removed from the path of the stock in timed relation with the cutting operation to facilitate ejection of each cut piece of stock and is then returned to effective position after ejection of the cut piece to locate the advancing stock for the next cutting operation.

Another object is to provide a method of cutting tubular stock by a shearing operation which is rapid and efficient and which does not result in burr formation or other objectionable distortion adjacent the cut edges.

An additional object is to provide such a tube cutting method which is readily adapted to be performed on a punch press or other machine for developing operating forces transversely of the stock and in which an inner and outer floating die and punch are caused to move transversely of an inner and outer stationary die and punch to execute the desired shearing strokes while supporting the tube against distortion.

Still another object is to provide tube cutting apparatus for use in conjunction with a punch press or like machine which includes cutting members operated by the press slide to shear off a piece from the stock during each working stroke of the press and which also includes a releasable clamp operated by the slide in timed relation with the cutting members to hold the stock against axial movement during the cutting operation and then to release the stock for feeding into position for the next cutting operation.

A further object is to provide tube cutting apparatus for use in conjunction with a punch press or like machine which includes an anvil device operated by the press slide in conjunction with the cutting members of the apparatus for straightening or rounding out dented or otherwise distorted parts of the stock which might interfere with the proper feeding of the stock into the cutting members.

Other objects and advantages of the invention will be apparent from the following description, the accompanying drawings and the appended claims.

In the drawings, in which like characters of reference designate like parts throughout—

Figure 1:
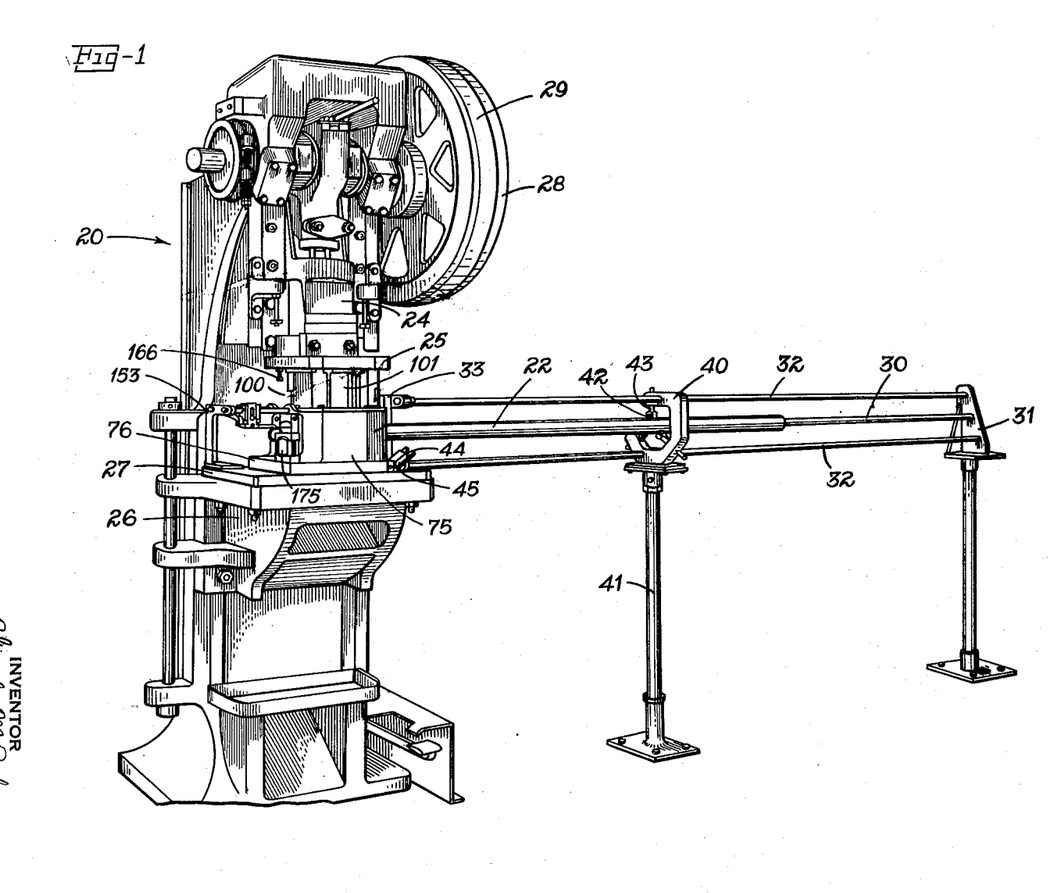
Fig. 1 is a view in perspective illustrating tube cutting apparatus in accordance with the invention mounted for operation in a punch press.

Referring to the drawings, which illustrate a preferred embodiment of the invention, Fig. 1 shows a punch press indicated generally at 20 and embodying tube cutting apparatus in accordance with the invention for cutting the tube or workpiece 22 into successive smaller lengths 22a (Figs. 4, 14, 16 and 18). The press 20 includes a slide or plunger 24 which carries a plate 25 and is mounted for reciprocating movement with respect to the bed 26 and the base plate 27 which supports the cutting apparatus. Power for the reciprocating movement of the slide is supplied from any suitable motor and drive shaft, not shown, to the drive pulley 28 through the belt or belts 29. The tube cutting apparatus includes dies carried by the press bed 26 and so constructed and arranged that during a single downward stroke of the plunger, they execute a plurality of shearing movements transversely of the axis of tube 22, thus cutting off the end of the tube cleanly and with minimum distortion and loss of stock.

Figures 2, 3, 4, 5:
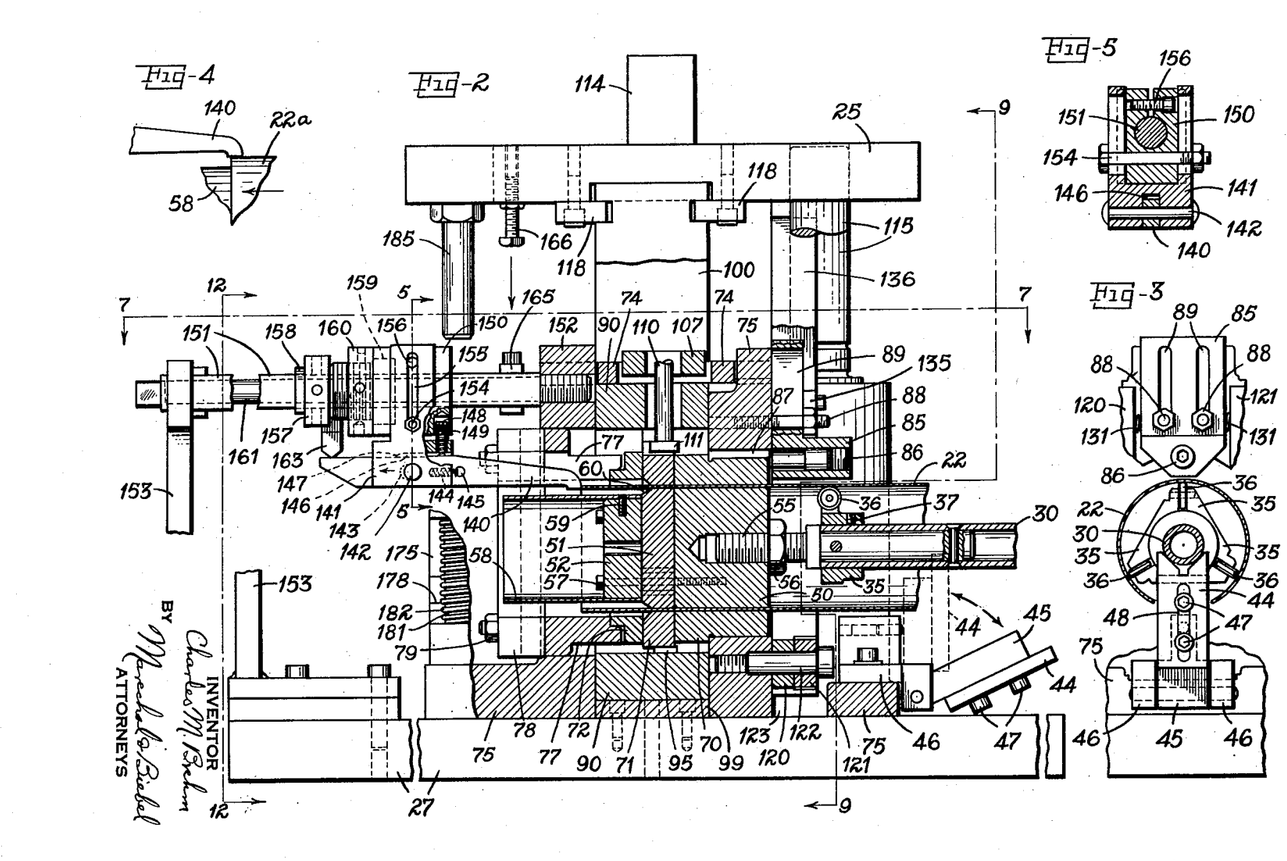
Fig. 2 is a view of the tube cutting dies and the stop mechanism for positioning the tube, the view being partly in side elevation and partly broken away and in section substantially on the line 2—2 of Fig. 6.
Fig. 3 is a fragmentary view looking at the right-hand side of the apparatus as viewed in Fig. 2 and showing certain of the guiding and supporting parts.
Fig. 4 is a fragmentary view in side elevation illustrating the operation of the stop mechanism and showing the stop arm in released position.
Fig. 5 is a sectional view on the line 5—5 of Fig. 2 illustrating details of construction of the stop mechanism.
Figures 7, 8:
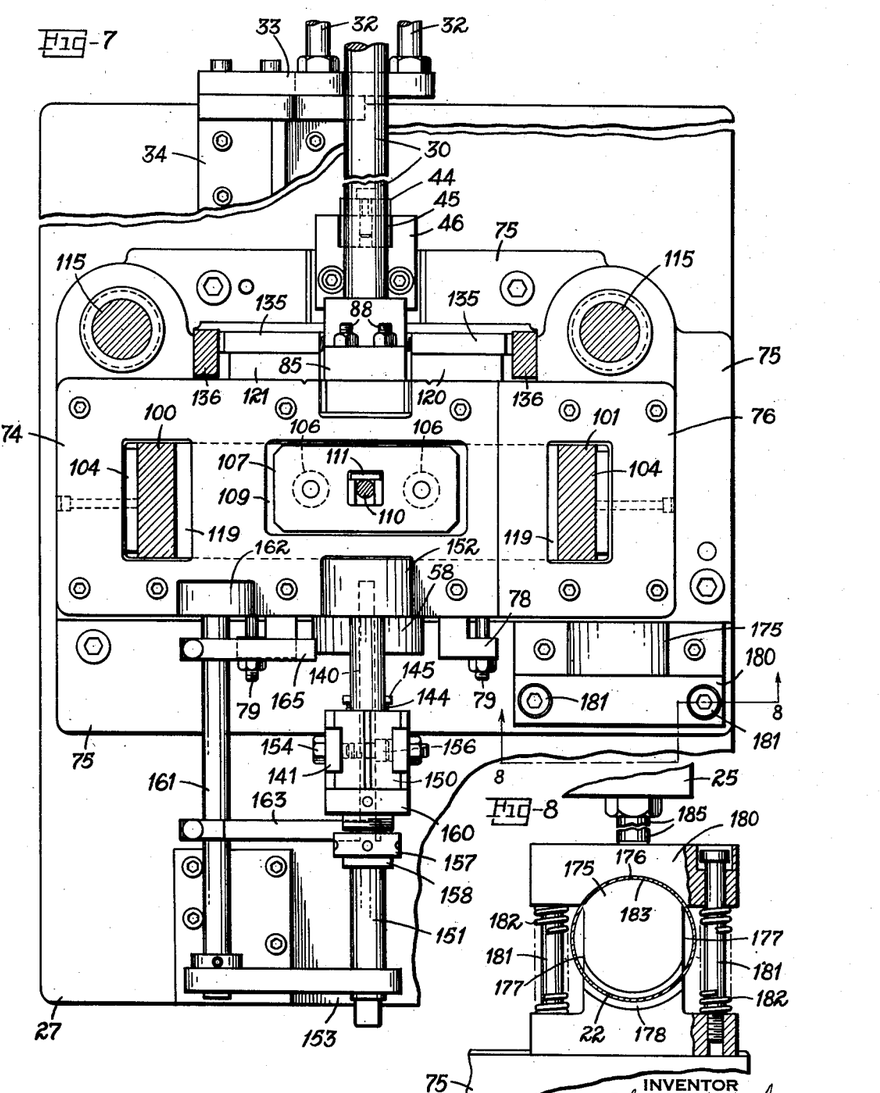
Fig. 7 is a top view taken approximately on the line 7—7 of Fig. 2.
Fig. 8 is a fragmentary view looking in the direction indicated by the line 8—8 of Fig. 7 and showing the parts of the apparatus for straightening distorted or dented portions of the tubing.

The tube 22 is mounted in telescoping relation with a rod 30 having its end remote from the press secured in a suitable supporting bracket 31 fixed to the floor and also fixed in spaced relation with the press by means of a pair of reinforcing rods 32 having their outer ends secured to bracket 31 and their ends adjacent the press fixed to a bracket member 33 bolted to the base plate as indicated at 34 in Fig. 7. The rod 30, which may be hollow to save weight, carries a plurality of axially spaced supporting brackets 35, one of which is shown in Figs. 2 and 3. Each such bracket is generally triangular in shape and carries three supporting rollers 36 adapted to engage the inner surface of tube 22. These brackets 35 are adjustably secured to rod 30 by set screws 37, and they support the work tube in accurately centered relation with rod 30 and at the same time provide for ready feeding movement of the tube axially of the supporting rod. The work tube 22 is also supported by a fixed mounting bracket 40 carried by a support 41 intermediate the press and the mounting bracket 31 and having the general configuration of the letter C. This bracket 40 carries three angularly spaced guide rollers 42, each of which is mounted in a yoke 43 threaded in the bracket 40 for ready adjustment to accommodate different sizes of tubing.

The rod 30 is provided with a releasable support adjacent the press comprising a yoke 44 carried by a block 45 pivoted in a forked bracket 46 which is bolted to a portion of the main frame block 75. This yoke 44 may be swung to a vertical position, shown in dotted lines in Fig. 2, to support rod 30 in centered position preparatory to inserting a tube in the press to be cut. When the tube is fed into the press, from left to right in Fig. 2, it abuts yoke 44 and knocks it down to the inoperative position, shown in full lines in Fig. 2, which it occupies during cutting operations. The yoke 44 is thus used to support rod 39 only when there is no stock in the cutting dies. The connection between yoke 44 and block 45 comprises bolts 47 and a slot 48 in the yoke which allow for adjustment to support rod 30 in accurately centered relation with the cutter assembly.

The assembly of inner cutting dies comprises a stationary cutter or punch 50, a movable cutter or punch 51 and a member 52 which is stationary with respect to cutter 50 and serves to support and guide cutter 51 for movement relative to cutter 50, each of the cutters 50 and 51 having cylindrical outer surfaces of substantially the same outer diameter as the inner diameter of tube 22 and fitting closely within the tube to support it against distortion during cutting. The stationary cutter 50 is secured to the rod 30 by means of a threaded bolt or stud 55 which is secured to rod 30 and provided with a lock nut 56. The member 52 is secured to cutter 50 by three elongated bolts 57. A tubular extension 58 is bolted or otherwise secured to member 52 as indicated at 59 and serves as a temporary support for the piece of tubing cut off from the tube 22. The front or delivery end of cutter 51 is tapered at 60 to aid in guiding the end of tube 22 through the dies when the tube is being fed into the apparatus preparatory to cutting.

Figures 13, 14:
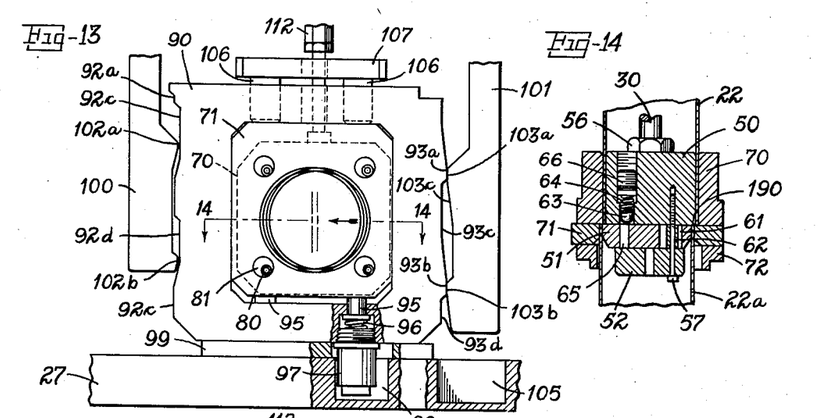
Fig. 13 is a somewhat diagrammatic fragmentary view looking in the same direction as in Fig. 6 and illustrating the operation of the cutting dies, the view showing the position of the parts at the end of the first cutting stroke.
Fig. 14 is a view in transverse section on the line 14—14 of Fig. 13.
Figures 15, 16:
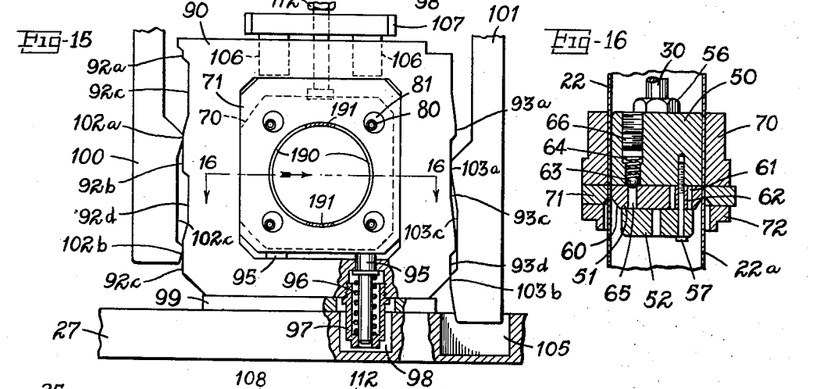
Fig. 15 is a view similar to Fig. 13 but showing the positions of the parts after completion of their return movement from the position shown in Fig. 13.
Fig. 16 is a view in transverse section on the line 16—16 of Fig. 15.

The cutter 51 is mounted for limited movement transversely of the axis of tube 22 with respect to cutter 50 and member 52. As best seen in Figs. 14 and 16, each of the bolts 57 passes through holes 61 of substantially greater diameter in cutter 51, and these bolts 57 carry bushings 62 which are also smaller in outer diameter than holes 61. The cutter 51 can thus move with respect to cutter 50 to the extent permitted by the difference between the outer diameter of each sleeve 62 and the diameter of holes 61. In addition, the sleeves 62 are slightly greater in length than the thickness of cutter 51, for example 0.005 inch greater, to provide a working clearance for movement of cutter 51 relative to cutter 50 and member 52. Detents are provided for indexing cutters 50 and 51, to yieldingly hold them in coaxial relation except during cutting operations. As shown in Figs. 14 and 16, each detent comprises a ball 63 and spring 64 which is mounted in cutter 50 and arranged to urge the ball 63 into seated relation within a bore 65 in cutter 51. A bolt 66 is threaded into cutter 50 behind each spring 64 to control the tension of the spring.

The assembly of outer cutting dies comprises an annular stationary cutter or die 70, an annular movable cutter or die 71 and an annular supporting or guiding member 72, each of these members being adapted to receive tube 22 therein. The cutters 70 and 71 include cylindrical inner surfaces having a sliding fit with the outer surface of tube 22 but the member 72 is of somewhat larger inner diameter to facilitate removal of the cut piece of tube from the dies. The cutter 70 includes a shank portion having a sliding fit in the main frame part or block 75, which is a hollow casting bolted to the base plate 27 and provided with two top plates 74 and 76. The cutters 70 and 71 and the member 72 are held in place by an annular clamping member 77, which includes laterally projecting, offset flange portions 78 bolted at 79 to the face of block 75. In addition, cutter 70 and member 72 are held together by bolts 80 (Fig. 11) which pass through enlarged bores 81 in cutter 71 and are provided with bushings 82, thus allowing limited transverse movement of cutter 71 with respect to cutter 70 and member 72 to the extent of the difference in diameter between bushings 82 and bores 81. The bushings 82 are slightly greater in length than the thickness of cutter 71, for example 0.005 inch greater, to give proper working clearance for cutter 71 between cutter 70 and member 72.

Figures 17, 18:
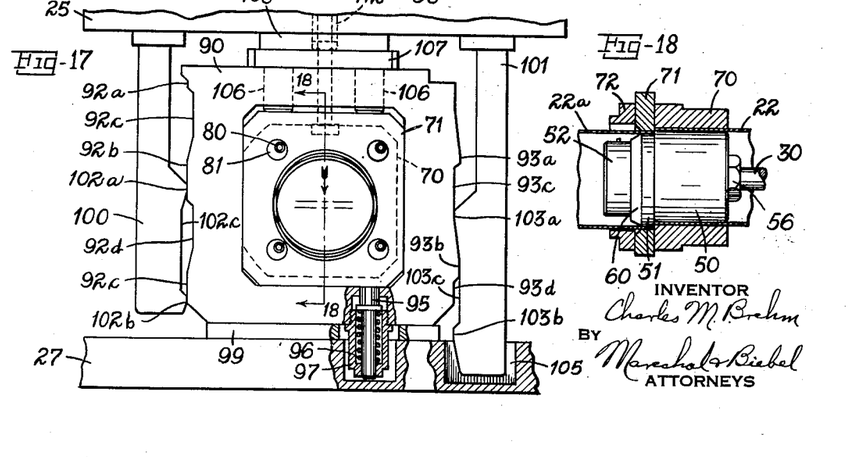
Fig. 17 is a view similar to Figs. 13 and 15 but showing the positions of the parts after completion of the second cutting stroke.
Fig. 18 is a view in vertical section on the line 18—18 of Fig. 17.

The internal cutters 50 and 51 and external cutters 70 and 71 operate in shearing relation to cut tube 22 in the plane defined by the adjacent faces of the cutters as shown in Figs. 14, 16 and 18, and these faces accordingly define the cutting edges of the cutters. In order to adjust the cutters axially to positions of proper alignment between their cutting faces, a bracket 85 (Figs. 2, 3 and 9) is secured to block 75 and provided with a threaded stud 86 adapted to engage the outer end of cutter 70, block 75 being provided with a clearance slot 87 for this stud 86. To provide for vertical adjustment, bracket 85 is secured to block 75 by bolts 88 in slots 89, and the portion of bracket 85 which carries stud 86 is thickened as shown in Fig. 2 for greater rigidity.

When the cutters are ground to recondition their cutting faces after periods of use, cutters 50 and 70 are ground to the same axial length. Cutter 70 is mounted in position first, with its circumferential shoulder portion clamped securely against block 75. Bracket 85 is then lowered by means of slots 89 to such position that stud 86 can be adjusted to bear on both of cutters 50 and 70. Cutter 50 is then inserted in place against stud 86, thus automatically aligning its cutting face with that of cutter 70, and any necessary adjustment of support bar 30 to hold cutter 50 may then be made by means of suitable nuts (not shown) at the supporting bracket 31. Thereafter bracket 85 is raised out of the way of the tube.

It will be seen that the cutter 70 is held stationary in block 75, and cutter 50 is similarly held stationary by reason of the close fit of the tube between the adjacent cylindrical surfaces of cutters 50 and 70. Means are provided for causing the cutter 71 to move transversely of the axis of the tube in a plurality of directions, and the cutter 51 moves with cutter 71, with the result that the four cutters cooperate to execute a plurality of shearing cuts in the plane of their cutting edges and completely sever the end section of the tube from the remainder of the stock. These shearing cuts are effected by the slide or plunger 24 of the press during its downward stroke, as will now be described.

The cutter 71 engages within a cam block 90 of annular configuration provided with cam surfaces 92 and 93 along its opposite sides, and this cam block 90 is mounted within receiving slots in block 75 for limited lateral movement transversely of the axis of tube 22. The side edges of cutter 71 are squared and in closely fitting engagement with the sides of the central aperture in cam block 90, but the vertical dimensions of this aperture are such as to permit limited up and down movement of cutter 71 within the cam block. It will also be noted, as best seen in Figs. 13, 15 and 17, that the lateral dimensions of cutter 70 are sufficiently less than the corresponding dimensions of cutter 71 to allow for limited lateral movement of cam block 90 without contact with cutter 70.

The cam block 90 carries two spring pressed pins 95 provided with springs 96 normally urging the heads of the pins upwardly and against the lower side of cutter 71 to raise the cutter into vertically centered relation with cutter 70. As shown, each pin 95 and spring 96 are mounted in a socket member 97 threaded into the lower side of cam block 90 and capable of lateral movement therewith in suitable receiving bores 98 in the base plate 27 and in a supporting plate 99 bolted to the base plate and formed of brass or other material providing a suitable bearing surface for cam block 90.

The lateral movement of cam block 90 is actuated and controlled by a pair of cam members 100 and 101 carried by the plunger plate 25, the cam 100 having a cam surface 102 cooperating with the cam surface 92 of block 90 and the cam member 101 having a cam surface 103 cooperating with the cam surface 93 on block 90. These cams are provided with bearing plates or gibs 104 bolted within block 75, and they operate during downward movement of the plunger to cause the cam block to move laterally and thus to carry out a shearing cut of the cutters and then to return laterally to its starting position. The base plate 27 is provided with a recess 105 for receiving the lower end of the longer cam 101 at the end of the downward stroke of the plunger as shown in Figs. 15 and 17.

Vertical movement of cutter 71 within cam block 90 against the pressure of the spring pressed pins 95 is also caused by the plunger 24 through a pair of pins 106 mounted for vertically sliding movement in the upper side of cam block 90 and secured to a small block or plate 107 positioned for reciprocating movement in a receiving aperture 109 (Fig. 7) in the top plate 74. The plunger plate 25 carries on its lower side a block 108 adapted to engage block 107, the parts being so proportioned with relation to the travel of the plunger 24 that the block 108 engages and forces block 107 and pins 106 downwardly at the end of the plunger stroke, as shown in Figs. 13 and 17, thus forcing cutter 71 downwardly with respect to cutter 70. Then as the plunger 24 begins its return stroke, the spring pressed pins 95 act to return cutter 71 to its center position.

The action of pins 95 is supplemented by a positive pickup means carried by the slide 24 and including a rod 110 having a squared head 111 at its lower end which engages in an inverted T-slot in the top of cutter 71. The upper end of rod 110 is secured to the lower end of a rod 112 having an enlarged head or flange 113 at its upper end fitting within a sleeve 114 carried by the plunger plate 25. The block 108 is provided with a central aperture for slidably receiving rod 112 but of smaller diameter than the rod head 113, these parts being proportioned to permit adequate lateral movement of rod 110 with cutter 71.

During the down stroke of plunger 24, the rod head 113 slides upwardly in sleeve 114 and thus transmits no force to cutter 71. However, the parts are so proportioned that if springs 96 fail to lift cutter 71 following its vertical cutting stroke, then as the plunger approaches its upper dead center position on the return stroke, the rod head 113 will engage block 108, and thus act through rod head 111 to lift cutter 71 to its center position in which it is coaxial with cutter 70. It will also be noted that the plunger and plate 25 are guided in their reciprocating movement by guide rods 115 of the usual type.

Figure 6:
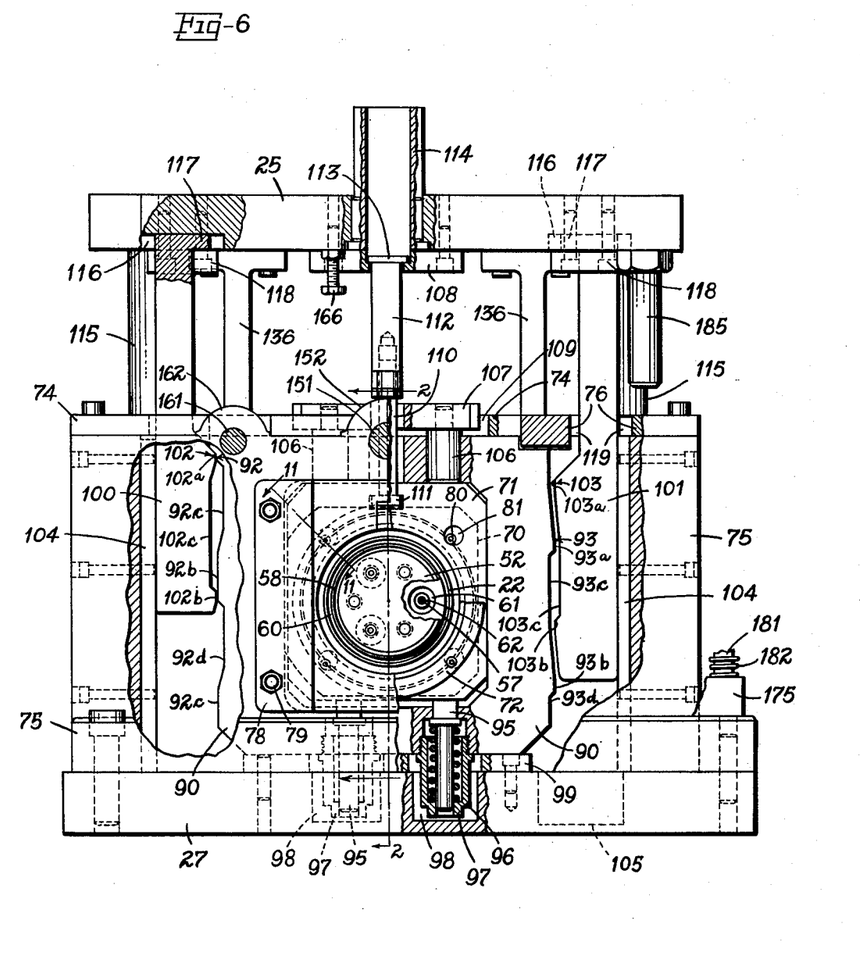
Fig. 6 is a view in elevation looking axially into the apparatus from the left-hand side as viewed in Fig. 2, parts being broken away to show internal construction.

It should also be noted that the extent of lateral movement of cam block 90 and cutters 71 and 81 can be readily varied and controlled by the introduction of shims of suitable thickness between gibs 104 and the adjacent portion of main block 75, and the cams 100 and 101 are accordingly provided with laterally adjustable connections to the plunger plate 25. As shown in Figs. 2 and 6, each cam extends into a recess 116 in the under surface of plate 25 and includes an inwardly projecting flange 117 at its upper end. Each cam is also slotted at either side to receive plates 118 which are bolted to the under side of plate 25 to clamp the cams in place. Thus when these clamp plates are released, cams 100 and 101 can be adjusted laterally as desired, clearance for these movements being provided by slots 119 (Figs. 6 and 7) in the top plates 74 and 76.

Figures 9, 10:
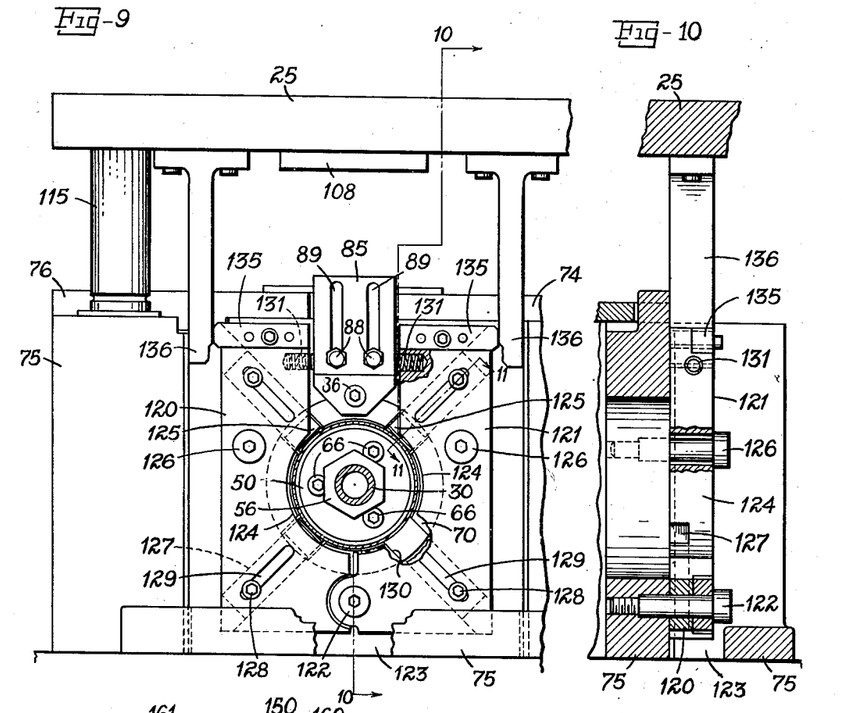
Fig. 9 is a view taken approximately on the line 9—9 of Fig. 2 showing the parts for clamping the tubing in the cutting apparatus and with the tubing removed for clarity of illustration.
Fig. 10 is a fragmentary sectional view taken substantially on the line 10—10 of Fig. 9.
Figure 11:
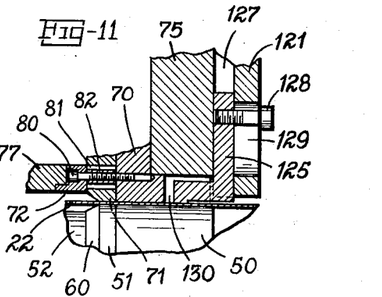
Fig. 11 is a detail view taken in section on the line 11—11 of Fig. 9 and also of Fig. 6.

Means are provided for clamping tube 22 in rigid relation to the block 75 during the cutting stroke, this clamping means being operated by the plunger in timed relation with the action of the cutters. Referring particularly to Figs. 9 and 10, two clamp members 120 and 121 are connected in pivoted relation by a bolt 122 secured to the block 75 as viewed in Fig. 2, the block 75 being provided with a transverse slot 123 to receive these parts, the extent of the pivotal movement being limited by bolts 126 which are set in block 75 and traverse holes of larger diameter in the clamp members. The clamp members 120 and 121 have semi-cylindrical cut out portions 124 of larger radius than the outer radius of the tube 22 to be cut, and each clamp member carries a pair of gripping members 125 adjustably mounted therein and adapted to engage and clamp the tube in position during cutting. As best seen in Fig. 11, each gripper 125 has a shape somewhat similar to the letter L, with the longer leg thereof being slidably mounted in a receiving slot 127 in the inner surface of one of the clamp members to provide for adjustment of the gripper radially of tube 22. The longer leg of gripper 125 also carries a clamp bolt 128 slidable in a receiving slot 129 in the supporting clamp member, and effective when tightened to secure the gripper and clamp member in rigid relation. The shorter legs or gripping portions of the grippers 125 are received in axially extending slots 130 through the shank portion of the cutter 70 so that the grippers 125 thus overlap the inner cutter 50 and hold the tube during cutting operations, the lower gripper having been removed in Fig. 10 for clarity of illustration.

The clamp members 120 and 121 are cut away above tube 22 to provide space for the bracket 85, and each clamp member carries a spring 131 arranged in a receiving bore as shown in Fig. 9 and engaging the side of bracket 85 to urge the clamp members normally to pivot in a direction to release tube 22. A cam member 135 is mounted along the upper edge of each of clamp members 120 and 121 and projects laterally into the path of a corresponding cam member 136 secured to the plunger plate 25 and extending downwardly therefrom.

When the plunger is in its upper position preparatory to its downward stroke, the cams 136 will be out of engagement with cams 135, and clamp members 120 and 121 pivot away from each other under the pressure of springs 131 to carry grippers 125 out of engagement with tube 22. When the plunger begins its downward stroke, the cams 136 will engage cams 135 and thus force clamp members 120 and 121 inwardly and into a position of clamping relation between grippers 125 and the tube 22. The cams 135 and 136 are so proportioned with respect to cams 100 and 101 that this clamping action takes place just before the beginning of the shearing movements of the cutters, and the tube is thus held clamped during the entire cutting operation but is released at the end of the up stroke of the plunger to provide for ready feeding in preparation for the next cut.

An adjustable stop mechanism is provided for positioning tube 22 in proper relation with the cutters to sever a desired length of stock, and this stop mechanism is operated by the press plunger in such manner that it is moved out of the way of the cut stock and is then reset for the next feeding operation. Referring particularly to Figs. 2, 5 and 7, a stop arm 140 is pivoted in a double yoke 141 by means of a pin or bolt 142 and slot 143 in arm 140, providing for limited sliding movement of the arm with respect to yoke 141. Yoke 141 is provided at its end adjacent the cutters with a pair of bores containing springs 144 which engage a pin 145 mounted transversely of arm 140, these springs acting to force arm 140 normally in the direction from left to right as viewed in Fig. 2 and towards the stock in the dies.

Pivotal movement of stop arm 140 in yoke 141 is limited by the configuration of the slot 146 in the yoke which receives the arm. As shown in Figs. 2 and 5, this slot is deeper at its end adjacent the press than at its outer end, thus providing a portion 147 of the yoke which acts as a stop to abut the outer end of the arm and prevent its movement, in clockwise direction as viewed in Fig. 2, beyond a substantially horizontal position. A socket member 148 is mounted in yoke 141 on the opposite side of pivot pin 142 from the stop portion 147 and it contains a spring 149 bearing against the upper surface of arm 140 to urge the arm to swing into a position of contact with the stop portion 147.

The yoke 141 is carried by a split collar 150 mounted on a rod or shaft 151 having one end threaded into an ear 152 extending upwardly from the adjacent upper edge of block 75, and the opposite end of shaft 151 is supported in a bracket 153 bolted or otherwise secured to the base plate 27. The yoke 141 is adjustable vertically with respect to collar 150, by means of bolt 154 in slot 155, to vary the vertical position of arm 140 in accordance with the diameter of the tube 22 to be cut. Collar 150 is likewise adjustable axially on shaft 151 to vary the distance of arm 140 from the cutters in accordance with the desired length of stock to be cut from the tube, and collar 150 includes a clamp bolt 156 for securing it in fixed relation to shaft 151. Additional control over the axial position of collar 150 is provided by a collar 157 carried by shaft 151 and limited against outward movement thereon by a U-shaped clip 158 which is received in a peripheral groove on shaft 151. The collar 157 includes a threaded portion receivable in a corresponding countersunk recess 159 in collar 150, and a lock nut 160 is threaded on this portion of collar 157 and provided with a suitable set screw for holding it in desired position on collar 157 to limit outward movement of collar 150 and the parts carried thereby.

Figure 12:
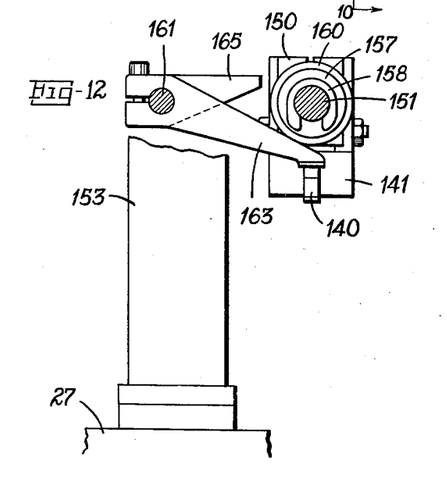
Fig. 12 is a view on the line 12—12 of Fig. 2 showing parts of the stop mechanism.

It will accordingly be seen that when the press plunger 24 is in its upper position preparatory to the working stroke of the press, the stop arm 140 will be held by spring 149 and stop portion 147 in the position shown in Fig. 2, in which its inner end is in position to abut the end of tube 22 to locate the tube in proper position for cutting off a desired length therefrom. Means are provided for operation by the plunger to lift the stock arm out of the way of the tube at the end of the cutting operation and thus to allow the cut stock to be discharged from the dies. Referring particularly to Figs. 7 and 12, a rock shaft 161 is mounted at one end in the bracket 153 and at its other end in an ear 162 on block 75 similar to the ear 152. This shaft 161 carries a lever 163 which extends into a position above the outer end of stop arm 140 to engage the arm 140. Another lever 165 is similarly secured to rock shaft 161 and extends radially therefrom into the path of a bolt or stud 166 carried by the plunger plate 25.

When the plunger descends in the operating stroke of the press and approaches its lower dead center position, bolt 166 will engage lever 165 and thus rock shaft 161 in a direction to cause the lever 163 to bear down on the outer end of arm 140 and thus to swing the inner or stop end of the arm upwardly to a sufficient extent to clear the end of the cut section of tube. As soon as this occurs, the spring 144 will force arm 140 toward the tube, to the right as viewed in Figs. 2 and 4, to the extent of the slot 143 and pin 142. When the plunger rises on the up stroke of the press, the pressure of spring 149 will cause arm 140 to swing in the opposite direction until it comes to rest on top of the cut section 22a of tubing, as shown in Fig. 4. Then as this cut section falls away, arm 140 will complete its return movement under the urging of spring 149, until it strikes the stop portion 147, in which position it will be properly in line with the tube 22 to stop the next feeding movement of the tube.

Means are provided for operation by the press plunger to straighten or round out end portions of the tube stock which may have been distorted or dented during handling. Referring particularly to Figs. 1, 7 and 8, an anvil 175 is mounted on a lower portion of block 75 and is provided with a top surface 176 curved about substantially the same radius as the tube 22. The sides 177 of anvil 175 are flattened, and a deep arcuate slot 178 is cut in the front face thereof about radii appreciably smaller and larger, respectively, than the radius of pipe 22. A block 180 is mounted for reciprocating movement with respect to anvil 175, the block being slidably mounted on a pair of bolts 181 set in the base of the anvil and provided with springs 182 positioned to urge block 180 upwardly. The under surface of block 180 is cylindrically curved at 183 about a radius substantially equal to the outer radius of tube 22. The plunger plate 25 carries a downwardly projecting stud 185 so positioned that it engages the upper surface of block 180 near the end of downward stroke of the press and forces the block downwardly and against anvil 175 to provide a hammer action on the anvil.

This anvil assembly is utilized when an end of the tube 22 to be cut is distorted to such an extent that it cannot be properly fed through the dies. The tube is telescoped over the upper part of the anvil and fitted between the curved surfaces 176 and 183, and the press can then be operated through the proper number of strokes required to eliminate the distortion, with the tube being rotated between strokes until its end is properly rounded. This anvil is also useful when the tube has one or more dents along its length. In such cases the tube is first fed into the press until the dent prevents it from passing through the dies, and the press is then operated to cut off the tube at the dented portion. The resulting dented end can then be straightened on the anvil as described, after which the piece of tube can be fed through the dies and onto rod 30 in readiness for cutting.

The operation of the apparatus as a whole is illustrated in Figs. 2 and 6 and Figs. 13 to 18. In preparing for a cutting operation, the yoke 44 is first erected to the position shown in dotted lines in Fig. 2 to hold rod 30 and cutter 50 in accurately centered relation with cutter 70. Also, with the press slide in its upper dead center position as shown in Fig. 6, the high points 102a and 102b on cam 100 will engage high points 92a and 92b on cam block 90 to hold cutter 71 centered with respect to cutter 70, the cutter 51 being similarly held in centered position by the detents 63—64 as already described. The tube 22 is then inserted in the press, from left to right in Fig. 2, during which operation it knocks yoke 44 down to the full line position shown in Fig. 2 as described above.

Figs. 2 and 6 show the relative positions of the cutters and cams preparatory to the first cutting stroke, with all of the cutters coaxial with the tube 22. As the plunger plate 25 and cams 100, 101 and 136 descend from the position shown in Fig. 6, the cams 136 will first engage cams 135 on clamp members 120 and 121 to force these clamp members and the grippers 125 into clamping relation with the tube as described in connection with Figs. 9 to 11. Next, the high points 93a, 93b, 103a and 103b on cam surfaces 93 and 103 engage and coact to cause movement of cam block 90 and cutter 71 from right to left as viewed in Fig. 6. At the same time, the cam 100 moves into a position in which its high points 102a and 102b are opposite low portions 92c and 92d of cam surface 92, the low portion 102c being similarly opposite the high point 92b of cam surface 92. This movement continues until the parts reach the relative positions shown in Figs. 13 and 14, and since the main part of tube 22 is held stationary with cutters 50 and 70 in block 75, and further since cutter 51 moves with cutter 71 as already described, this relative movement of the cutters causes shearing cuts at both sides of tube 22, as indicated at 190 in Figs. 14 and 15, leaving portions 191 at the top and bottom of the tube still uncut.

As the press slide and plate 25 continue their downward movement, the high points 103a and 103b of cam surface 103 run off the high points 93a and 93b of cam surface 93 and into corresponding low portions 93c and 93d, the high point 93b being then similarly received by a low portion 103c. The high points 102a and 102b then engage high points 92b and 92c of cam surface 92 and coact therewith to move cam block 90 and cutters 71 and 51 in the opposite direction, from left to right in Fig. 6, until these parts return to positions of coaxial relation as shown in Figs. 15 and 16. It will be apparent that these movements are relatively slight, as clearly shown in Fig. 13, thus minimizing any initial distortion of the tube at the remaining uncut portions 191. In addition, this return movement of the cutters to positions of coaxial relation will effect substantially complete correction of any such distortion preparatory to the final shearing stroke.

During the remainder of the downward stroke of the slide from the position of the cam and cutter members shown in Fig. 15, all four cam surfaces cooperate to maintain cam block 90 in laterally centered relation with tube 22, but as the plate 25 approaches lower dead center the block 108 thereon engages block 107 and acts to force pins 106 downwardly against cutter 71. This in turn causes cutters 71 and 51 to move downwardly in cam block 90 against the spring actuated pins 95 until the parts reach the relative positions shown in Figs. 17 and 18. During this movement of the cutters, the portions 191 of tube 22 are sheared off as shown. In addition, the bolt 166 will act during this final downward movement of the slide to release stop arm 140, as already described, and to cause this arm to swing upwardly and out of contact with the piece 22a cut off from tube 22.

When the press slide begins its upward movement and removes the pressure on pins 106, the spring pressed pins 95 will act to return cutter 71 to the vertically centered position shown in Fig. 15. Also, stop arm 140 will be released to swing downwardly to its operative position, but springs 144 will in the meantime act to move this arm laterally toward the dies to such an extent that when the inner end of the arm descends, it will overlap and rest on the upper edge of the cut piece of stock, which is still supported between cutters 51 and 71, instead of immediately moving into the operative position shown in Fig. 2, this position of stop arm 140 being shown in Fig. 4.

As the slide continues upwardly on its return stroke from the position of the cams and cutters shown in Fig. 15, cam surfaces 92, 93, 102 and 103 will cause the cutters to execute the reverse of the lateral movements already described, but these movements will have no effect on the stock. When the slide reaches its upper dead center position, the cams 136 will move clear of cams 135 and thus release clamp members 120 and 121 in preparation for feeding of the stock. The tube 22 is then ready to be fed forward, which may be done manually or automatically, in preparation for the next cutting operation. The advancing end of the tube will first push the cut piece 22a out from between cutters 51 and 71, thus allowing this piece 22a to drop free onto the extension 58 of member 52. This will in turn allow arm 140 to swing all the way downwardly into horizontal position, so that as the tube advances further it will strike the end of arm 140 and force it outwardly against the springs 144 to the full extent permitted by the slots 143 as already described. The parts are then in readiness for repetition of the next working stroke of the press.

It will accordingly be seen that during each working stroke of the press slide, the apparatus will carry out a plurality of shearing cuts in different directions transversely of the tube to cut off lengths 22a of predetermined dimensions in accordance with the initial lateral setting of the stop mechanism. These shearing operations will take place with substantially no loss of stock at the points where the cuts are made, and also the cut ends will be substantially free of distortion, burrs or other irregularities resulting from the cutting operation. It should be noted particularly in connection with Figs. 13 to 18 that the cam surfaces 92, 93, 102 and 103 may readily be arranged in such manner that the cutting members go directly from the position shown in Fig. 13 to the positions shown in Fig. 17, but it has been found that the intermediate centering movement to the positions shown in Fig. 15 effects preferred results from the standpoint of correction of such distortion of the uncut portions 191 of the tube as may occur during the initial cutting stroke. It will also be seen that the construction of the cutting and supporting parts offers material advantages from the standpoint of both simplicity of initial manufacture and assembly and also of ready maintenance, particularly from the standpoint of the removal of the cutters for sharpening and the subsequent resetting thereof.

Under some conditions, particularly when cutting relatively light gage stock, it is found that the distortion resulting from the initial cutting stroke is more completely eliminated by return movement of the cutters beyond center before the final cutting stroke, and Figs. 19 to 22 show the construction of a form of cutting apparatus in accordance with the invention in which provision is made for this additional movement of the cutters. The main block 200 and base plate 201 are similar to the corresponding parts of the apparatus of Figs. 1 to 18, and the pressure plate 202 corresponds to plate 25 and is supported for vertical reciprocating movement along guide rods 203. The cams 204 and 205 are secured to plate 202 by clamp plates 206 to provide for the desired adjusting movement as described in connection with cams 100 and 101.

Figure 19:
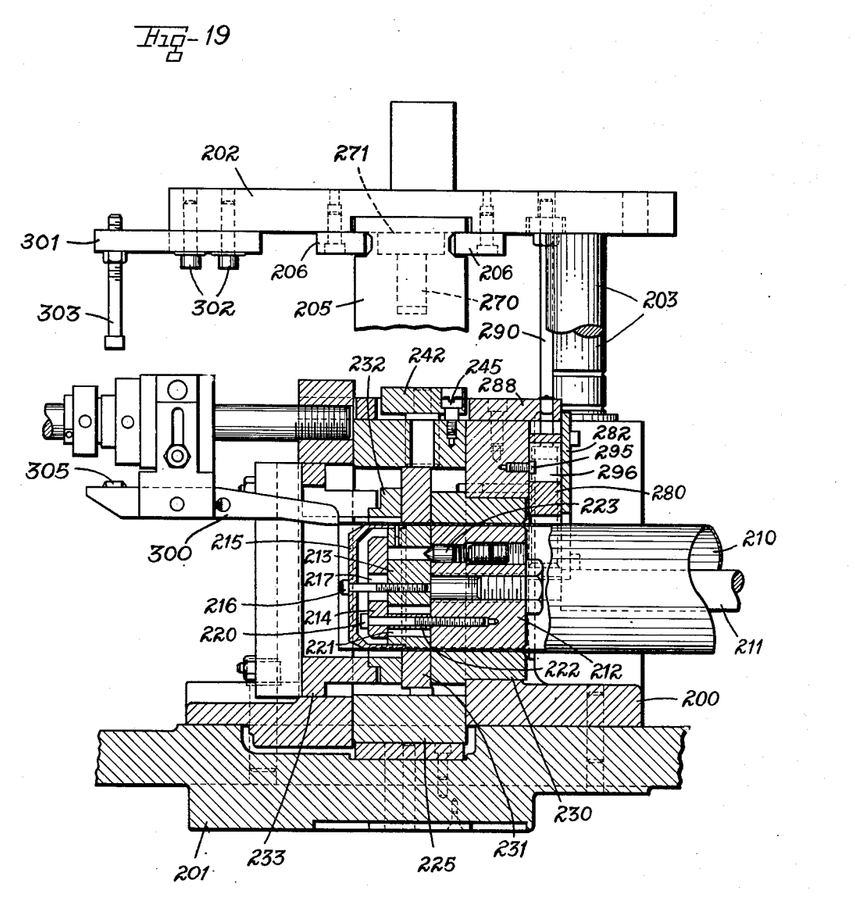
Fig. 19 is a sectional view on the line 19—19 of Fig. 20 showing a modified construction of tube cutting apparatus in accordance with the invention.
Figure 20:
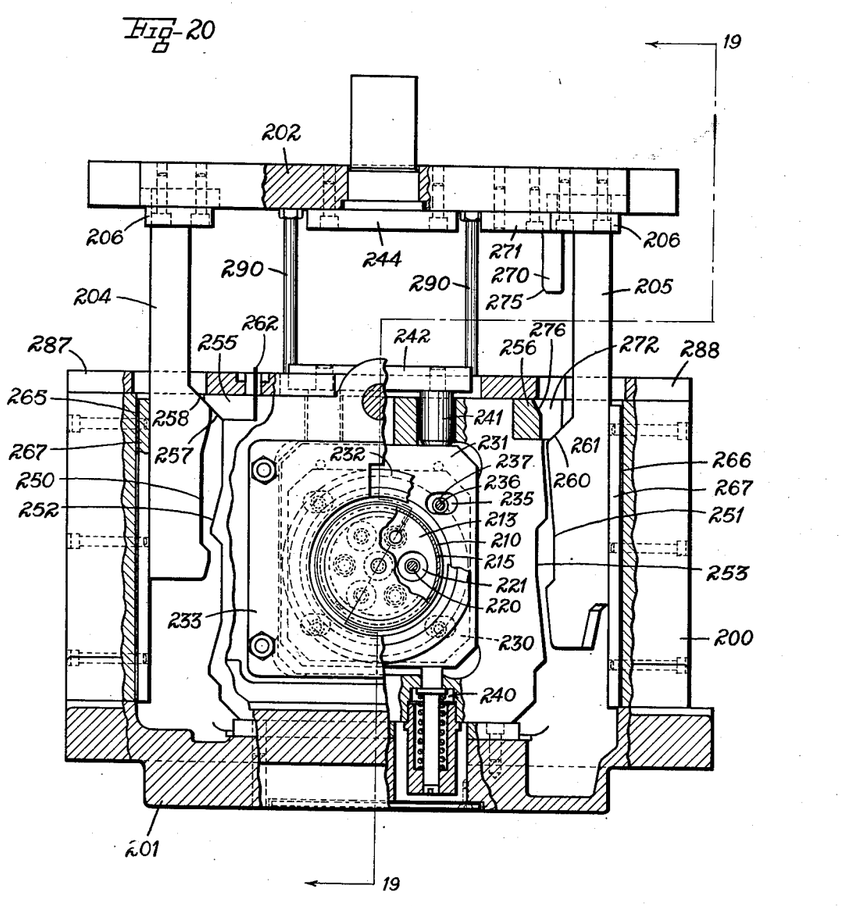
Fig. 20 is a view in elevation looking axially into the apparatus of Fig. 19 from the left hand side as viewed in Fig. 19 and with parts broken away to show details of internal construction.

The tube to be cut is shown at 210, and the inner cutting assembly is supported within the tube by a rod 211 and includes a stationary cutter or punch 212, a removable cutter or punch 213 and a guide member 214. In addition, an end cap 215 having a tapered outer end is secured to the removable cutter 213 by a bolt 216 passing through an enlarged center opening 217 in guide member 214. The stationary cutter 212 and guide member 214 are connected by bolts 220 passing through enlarged holes 221 in movable cutter 213, and bushings 222 are provided on bolts 220 of slightly greater length than the thickness of cutter 213 to assure proper operating clearance for the movable cutter as already described in connection with the cutter 51. Detents indicated generally at 223 are also provided for normally centering cutter 213 similarly to the cutter 51 and detents 63—64.

The outer cutter assembly is operated by a cam block 225 similar to cam block 90, and it includes a stationary cutter or die 230, a movable cutter or die 231, a guide member 232 and a clamping member 233. Provision is made for substantial lateral movement of cutter 231 with respect to cutter 230 by means of elongated slots 235 in cutter 231 for receiving the bolts 236 holding cutter 230 and guide member 232 together, bolts 236 having bushings 237 thereon of the proper slightly greater length than the thickness of cutter 231. Provision is also made for vertical movement of cutter 231 in cam block 225 against spring pin assemblies indicated generally at 240 and similar to the corresponding parts in Fig. 5. This vertical movement is effected through pins 241 and plate 242 at the top of the cam block by a plate 244 carried by the under side of pressure plate 202. Accidental displacement of plate 242 is prevented as shown in Fig. 19 by a shouldered bolt 245 threaded into the top of the cam block 225.

The sidewise movement of cam block 225 for operating the cutter 231 is effected by cams 204 and 205 in a manner similar to that described in connection with Figs. 13 to 18, these cams having cam surfaces indicated generally at 250 and 251 which cooperate with the complementary cam surfaces 252 and 253 on cam block 225. In addition, cam bars 255 and 256 are mounted at the upper corners of cam block 225 for centering the cam block and cutters at the proper times during the operating cycle of the press. The cam bar 255 has a beveled edge 257 adapted to be engaged by the beveled surface 258 on cam 204, and the cam bar 256 has a similar beveled edge 260 adapted to be engaged by the beveled surface 261 on cam 205. These beveled edges and surfaces cooperate as the pressure plate reaches the upper limit of its stroke to center the cam block 225 in the apparatus. Adjustment of these parts can be obtained as desired by means of a shim 262 between the inner side face of cam bar 255 and the adjacent surface of the cam block.

The cams 204 and 205 are normally so proportioned and arranged that in their outermost positions of adjustment in plate 202, they would be out of contact with the sides of the cam block throughout their full vertical strokes. Accordingly, in initially adjusting the apparatus, the clamp plates 206 are loosened and shims 265 and 266 of the proper thicknesses are inserted between gibs 267 and the sides of block 200. For example, if the tubing 210 to be cut is $\frac{1}{32}$ inch in thickness, then a shim 266 approximately $\frac{1}{32}$ inch in thickness is inserted between block 200 and the gib 267 for cam 205. This shim is not necessarily of the same thickness as the tube wall provided it is sufficiently thick to effect complete fracture of the sides of the tube in operation, and on heavier tubing, this shim and the movement of the cam block may be less than the tube wall thickness. The return horizontal movement of the cam block is caused by cam 204, and as stated, distortion of the tube caused by the first cutting stroke may be more effectively eliminated when this return stroke is greater than the cutting stroke effected by cam 205. This can be readily accomplished by using a shim 265 somewhat thicker than shim 266.

Since under these operating conditions, the cam block and movable cutters move beyond center on their return stroke, it is desirable that they again be centered before the vertical stroke of the movable cutters. This centering movement is accomplished by means of a cam 270 extending downwardly from a plate 271 bolted to the under side of pressure plate 202 and engaging in a center slot 272 in the cam bar 256. The lower end of cam 270 and the upper edge of slot 272 have complementary beveled edges 275 and 276 which cooperate to return the cam block to the properly centered position as the pressure plate 202 approaches its lowermost position but before the engagement between plates 242 and 244 which effects the downward vertical stroke of the movable cutters.

If the shims 265 and 266 are of such thicknesses that the stroke of the press requires adjustment, proper centering of the cutters at the end of the upper stroke is obtained by the use of a suitable shim 262. Thus if shim 266 is thicker than shim 265, an additional shim equal to the difference in thickness should be inserted with the shim 262. On the other hand, if shim 265 is thicker than shim 266, then a thinner shim 262 should be used which is chosen to be of such thickness as to assure centering of the cutters when the pressure plate 202 is in its uppermost position.

Figure 21:
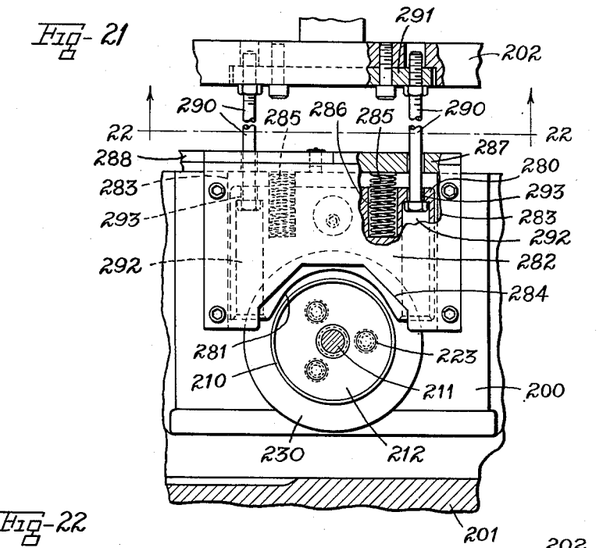
Fig. 21 is a fragmentary view looking from right to left in Fig. 19 to show the parts for clamping the tubing and with portions broken away to illustrate internal construction.
Figure 22:
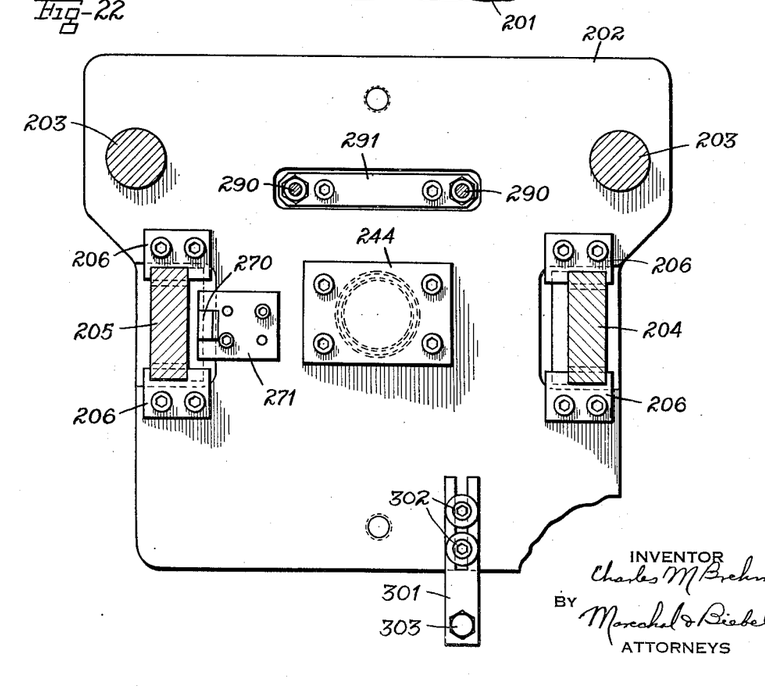
Fig. 22 is a view of the underside of the pressure plate looking upwardly as indicated by the line 22—22 of Fig. 21.

Figs. 19 to 22 also show a somewhat different construction of clamping mechanism for holding the tube against axial movement during the cutting operation. Referring particularly to Figs. 19 and 21, the clamp is a block 280 which is supported for vertical reciprocating movement at the back of main block 200. The clamp 280 has an arcuate clamping surface 281 in its lower edge, and it is supported by a retainer plate 282 bolted to the back of the main block 200 and provided with spacers 283 at either side. The retainer 282 has a cutout portion 284 in its lower edge which is larger than the clamping surface 281 of clamp 280, and spacers 283 are spaced laterally from each other by a distance sufficient to provide for appreciable lateral movement of clamp 280, for example a total movement of approximately $\frac{1}{16}$ inch.

The clamp 280 is provided with a pair of springs 285 set in bores 286 in its upper surface and bear against the lower surfaces of the top plates 287 and 288, these springs thus normally urging the clamp downwardly and against the tube 210. In order to retract the clamp away from the tube, two elongated bolts 290 are suspended from a plate 291 bolted in the pressure plate 202, and the heads of these bolts ride in vertical bores 292 extending upwardly in clamp 280. These bolts are adjusted to such length that as the pressure plate approaches its uppermost position, the bolt heads will engage the upper ends of bores 292 and lift the clamp against springs 285 to release the tube. It will also be noted that the bolts 290 have appreciable clearance at 293 in the clamp to permit the desired lateral movement of the clamp. A shouldered screw 295 (Fig. 19) is set in the back of block 200 with its head extending into a cylindrical hole 296 through clamp 280 to serve as a safety stop limiting movement of the clamp.

It will thus be seen that when the pressure plate 202 is in its uppermost position, the clamp 280 will be retracted to release the tube for feeding, but as the pressure plate descends, the springs 285 will urge the clamp downwardly against the tube. At the same time, however, the clamp will be free to move sidewise with the tube during the cutting strokes of the cutters as may prove necessary. Provision for such movement is desirable particularly with tubing which varies from true cylindrical shape, since in order to handle such tubing satisfactorily, it is necessary to have somewhat greater clearance between the inner and outer cutters than would otherwise be the case. As a result of this necessary clearance, there is usually some sidewise movement of the tube during cutting, and this clamping mechanism as described permits such movement and thus aids in preventing distortion of the tube.

The remaining structural details of the apparatus shown in Figs. 19 to 22 are generally similar to that of the apparatus described in connection with Figs. 1 to 18 with the exception of simplification of the actuating mechanism for the stop arm 300. A bar 301 is adjustably bolted at 302 to the under side of pressure plate 202 and extends forwardly therefrom. A bolt 303 extends downwardly from bar 301 and is adapted to engage the bar 305 welded to the outer end of stop arm 300 and extending laterally therefrom below bolt 303. Otherwise the stop mechanism functions in the same manner as already described to locate the advancing end of the tube in proper position during feeding and to move out of the way of the cut end of the tube to provide for free discharge of the cut piece.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus of the character described for cutting tubular stock comprising, in combination with a press having a reciprocating slide, a frame, first and second cutting members having cutting faces arranged in face to face relation for relative shearing movement with respect to said stock, means supporting said first cutting member against movement in said frame transversely of the axis of said stock, means supporting said second cutting member for shearing movement with respect to said first cutting member transversely of the axis of said stock, a bracket carried by said frame in adjustably overhanging relation with said cutting members, adjusting means mounted in said bracket for movement axially of said stock and adapted to engage said cutting members to effect axial alignment of the cutting face of first cutting members, and means for retaining said second cutting member in said alignment with said first cutting member following release of said adjusting means.

2. Apparatus of the character described for cutting tubular stock in a press having a reciprocating slide, comprising two pairs of inner and outer cutting members, each of said pairs including an inner punch and a continuous annular die adapted to receive said stock therebetween, means for supporting said pairs of cutting members in said press in closely adjacent relation axially of said stock, means adapted for mounting on said slide for operation during a portion of the stroke of said slide to cause one of said pairs of cutting members to move conjointly with respect to the other said pair in the plane defined by the axially adjacent surfaces of said pairs of cutting members, means for restricting said movement of said cutting members to a predetermined limited distance causing said members to effect only partial shearing of the entire circumference of said stock at opposite side portions thereof while leaving said stock integrally connected in the portions thereof lying generally lengthwise of said movement and while supporting said stock against distortion, and means adapted for mounting on said slide for operation during another portion of the stroke thereof to cause said one pair of cutting members to move relative to the other said pair in a direction in said plane at a substantial angle to said first movement thereof to complete the shearing of said stock.

3. Apparatus of the character described for cutting tubular stock in a press having a reciprocating slide, comprising two pairs of inner and outer cutting members, each of said pairs including an inner punch adapted for insertion within said stock and a continuous annular die adapted to encircle said stock and said punch, means supporting said pairs of cutting members in said press in closely adjacent relation axially of said stock, cooperating means on said slide and said mounting means operative during a portion of the stroke of said slide to cause one of said pairs of cutting members to move conjointly with respect to the other said pair transversely of said stock, means for restricting said movement of said cutting members to a distance not substantially greater than the thickness of said stock to cause said cutting members to shear said stock in two arcs spaced from each other by remaining integral arcuate portions, and cooperating means on said slide and said supporting means operative during another portion of the stroke of said slide to cause said one pair of cutting members to execute a second movement transversely of the axis of said stock and of the direction of said first cutting movement to complete the shearing of said integral portions of said stock.

4. Apparatus of the character described for cutting tubular stock in a press having a reciprocating slide, comprising two pairs of inner and outer cutting members, each of said pairs including an inner punch adapted for insertion within said stock and a continuous annular die adapted to encircle said stock and said punch, means supporting said pairs of cutting members in said press in closely adjacent relation axially of said stock, cooperating means on said slide and said mounting means operative during a portion of the stroke of said slide to cause one of said pairs of cutting members to move conjointly with respect to the other said pair transversely of said stock and of the stroke of said slide, means for restricting said movement of said cutting members to a distance not substantially greater than the thickness of said stock to cause said cutting members to shear said stock in two arcs spaced from each other by remaining integral arcuate portions, and means on said slide and said supporting means operative during another portion of the stroke of said slide to cause said one pair of cutting members to execute a second movement transveresly of said stock and in substantially the same direction as the stroke of said slide to complete the shearing of said integral portions of said stock.

5. Apparatus of the character described for cutting tubular stock, comprising two pairs of inner and outer cutting members, each or said pairs including an inner punch adapted for insertion within said stock and a continuous annular die adapted to encircle said stock and said punch, means supporting said pairs of cutting members in closely adjacent relation axially of said stock, driving means for said apparatus having an operating cycle, means operative during a first portion of said cycle for causing one of said pairs of cutting members to move in a substantially straight line with respect to the other said pair transversely of the axis of said stock, means for restricting said movement of said cutting members to a predetermined limited distance to effect only partial shearing of the entire circumference of said stock at opposite side portions thereof while leaving said stock integrally connected in the portions thereof lying generally lengthwise of said movement, means operative during a second portion of said cycle to cause a return movement of said one pair of cutting members in substantially the opposite direction to a position of substantially centered relation with said other pair of cutting members, and means operative during a third portion of said cycle for causing relative movement of said pairs of cutting members substantially transversely of the other said movements and of the axis of said stock to complete the shearing of said stock.

6. Apparatus of the character described for cutting tubular stock, comprising two pairs of inner and outer cutting members, each of said pairs including an inner punch adapted for insertion within said stock and a continuous annular die adapted to encircle said stock and said punch, means supporting said pairs of cutting members in closely adjacent relation axially of said stock, driving means for said apparatus having an operating cycle, means operative during a first portion of said cycle for causing one of said pairs of cutting members to move in a substantially straight line with respect to the other said pair transversely of the axis of said stock, means for restricting said movement of said cutting members to a predetermined limited distance to effect only partial shearing of the entire circumference of said stock at opposite side portions thereof while leaving said stock integrally connected in the portions thereof lying generally lengthwise of said movement, means operative during a second portion of said cycle to cause said one pair of cutting members to move in the opposite direction to a position beyond centered relation with said other pair of cutting members to correct distortion in said stock, and means operative during a third portion of said cycle for causing relative movement of said pairs of cutting members substantially transversely of the other said movements and of the axis of said stock to complete the shearing of said stock.

7. Apparatus of the character described for cutting tubular stock comprising a frame, a pair of cutting members arranged for relative shearing movement transversely of said stock, means supporting one of said cutting members in stationary relation with said frame, a block mounted in said frame for back and forth movement in a single direction transversely of said stock, said block having an aperture therethrough for receiving the other of said cutting member, said aperture and said other cutting member being dimensioned to prevent relative movement of said other cutting member and said block in said direction of movement of said block with respect to said frame, said aperture being elongated in the direction transversely of said stock and of said direction of movement of said block to provide for relative movement of said other cutting member and said block transversely of said stock and of said direction of relative movement of said block and said frame, drive means for effecting an operating cycle of said apparatus, and operative connections from said drive to said block and said other cutting member for causing movement of said block with said cutting member during one portion of said cycle to effect shearing of portions at opposite sides of the circumference of said stock and for causing movement of said other cutting member with respect to said block during another portion of said cycle to complete the shearing of said stock around its entire circumference.

8. Apparatus of the character described for cutting tubular stock comprising a frame, a pair of cutting members arranged for relative shearing movement transversely of said stock, means supporting one of said cutting members in stationary relation with said frame, a block mounted in said frame for back and forth movement in a single direction transversely of said stock, said block having an aperture therethrough for receiving the other of said cutting member, said aperture and said other cutting member being dimensioned to prevent relative movement of said other cutting member and said block in said direction of movement of said block with respect to said frame, said aperture being elongated in the direction transversely of said stock and of said direction of movement of said block to provide for relative movement of said other cutting member and said block transversely of said stock and of said direction of relative movement of said block and said frame, drive means for effecting an operating cycle of said apparatus, said drive means including a reciprocating member, cooperating means on said reciprocating member and said block operative during one stage of said cycle for causing movement of said block with said cutting member to effect shearing of portions at opposite sides of the circumference of said stock, and cooperating means on said reciprocating member and said block operative during another portion of said cycle to cause movement of said other cutting member with respect to said block to complete the shearing of said stock around its entire circumference.

9. Apparatus of the character described for cutting tubular stock in a press having a frame and a reciprocating slide supported therein, comprising a pair of continuous annular cutting members adapted to encircle said stock and arranged for relative shearing movement with respect thereto, means supporting one of said cutting members in fixed relation with said frame, a cam block mounted for lateral movement in said frame transversely of said stroke and having cam surfaces thereon, said cam block having an aperture therethrough for receiving the other of said cutting members, the relative dimensions of said aperture and said other cutting member providing for relative vertical movement of said cutting member and said cam block while preventing relative lateral movement thereof, cam means adapted to be carried by said slide for cooperation with said cam surfaces during a portion of the working stroke of said slide to cause said cam block and said movable cutting member to move with respect to said fixed cutting member transversely of said stock and of the direction of said stroke to shear predetermined portions at opposite sides of the circumference of said stock, and means adapted to be mounted on said slide for operation during another portion of said stroke to cause vertical movement of said movable cutting member with respect to said cam block and said fixed cutting member to complete the shearing of said tube around its entire circumference.

10. Apparatus as defined in claim 9 comprising a pair of inner punch members adapted to be inserted within said stock and within said annular cutting members for relative movement with said annular cutting members.

CHARLES M. BREHM.

REFERENCES CITED

The following references are of record in the file of this patent:

UNITED STATES PATENTS

| Number | Name | Date |
|---|---|---|
| 1,216,426 | Erickson | Feb. 20, 1917 |
| 1,280,199 | Erickson | Oct. 1, 1918 |
| 1,635,807 | Amberg | July 12, 1927 |
| 1,715,138 | Lothrop | May 28, 1929 |
| 2,059,010 | Melin | Oct. 27, 1936 |
| 2,361,595 | Broersma | Oct. 31, 1944 |
| 2,397,048 | Roop | Mar. 19, 1946 |
| 2,435,469 | Roop | Feb. 3, 1948 |